United States Patent
Zierer et al.

(10) Patent No.: US 6,369,172 B1
(45) Date of Patent: Apr. 9, 2002

(54) PROCESS FOR USING NITRIC ACID TO OXIDIZE POLYARYLENE SULFIDE TO POLYARYLENE SULFOXIDE

(75) Inventors: Dirk Zierer, Hofheim; Helmut Scheckenbach, Langen; Michael Dierolf, Waldbrunn, all of (DE)

(73) Assignee: Ticona GmbH (DE)

( * ) Notice: Subject to any disclaimer, the term of this patent is extended or adjusted under 35 U.S.C. 154(b) by 0 days.

(21) Appl. No.: 09/548,066

(22) Filed: Apr. 12, 2000

(30) Foreign Application Priority Data

Apr. 12, 1999 (DE) .......................... 199 16 495

(51) Int. Cl.[7] .......................... C08F 283/00; C08F 6/00
(52) U.S. Cl. .................. 525/535; 525/537; 525/540; 528/486; 521/189
(58) Field of Search ................ 525/535, 537, 525/540; 528/486; 521/189

(56) References Cited

U.S. PATENT DOCUMENTS

| | | | |
|---|---|---|---|
| 3,303,087 A | 2/1967 | Smith | |
| 3,326,865 A | 6/1967 | Smith | |
| 5,691,427 A | * 11/1997 | Scheckenbach et al. | .... 525/537 |
| 5,708,041 A | 1/1998 | Scheckenback et al. | |
| 5,712,350 A | * 1/1998 | Fleicher et al. | ............. 525/535 |
| 5,716,999 A | 2/1998 | Frank et al. | |
| 5,760,147 A | 6/1998 | Schönfeld et al. | |
| 5,786,397 A | 7/1998 | Scheckenback et al. | |
| 5,789,452 A | 8/1998 | Frank et al. | |
| 5,907,029 A | 5/1999 | Disch et al. | |
| 6,013,761 A | 1/2000 | Zierer et al. | |
| 6,020,442 A | * 2/2000 | Fleischer et al. | ........... 525/537 |

FOREIGN PATENT DOCUMENTS

| | | |
|---|---|---|
| DE | 1 211 399 | 2/1966 |
| DE | 12 11 399 | 2/1966 |
| DE | 197 51 239 | 5/1999 |
| EP | 0 738 760 | 10/1996 |
| EP | 0 790 274 | 8/1997 |
| EP | 0 829 505 | 3/1998 |
| EP | 0 829 505 A1 | 3/1998 |
| WO | WO 96/05246 | 2/1996 |
| WO | WO 96 15178 | 5/1996 |
| WO | WO 96/15178 | 5/1996 |

* cited by examiner

*Primary Examiner*—Morton Foelak
(74) *Attorney, Agent, or Firm*—Connelly Bove Lodge & Hutz LLP

(57) ABSTRACT

The invention relates to a process for using nitric acid to oxidize polyarylene sulfide to polyarylene sulfoxide, oxidizing at least 98% of the sulfide groups of the polyarylene sulfide to sulfoxide groups. According to the invention polyarylene sulfide is treated with nitric acid at a concentration of from 60 to 80% with heating. The polyarylene sulfoxide prepared by the novel process can be used as an excellent chemical blowing agent for foaming thermoplastics.

15 Claims, No Drawings

PROCESS FOR USING NITRIC ACID TO OXIDIZE POLYARYLENE SULFIDE TO POLYARYLENE SULFOXIDE

The present invention relates to a process for using nitric acid to oxidize polyarylene sulfide to polyarylene sulfoxide, oxidizing at least 98% of the sulfide groups of the polyarylene sulfide to sulfoxide groups.

Polyarylene sulfoxides are specialty engineering polymers, applied in particular where high requirements are placed on the polymeric material. For example, polyarylene sulfoxides have high glass transition temperatures, high melting points and high decomposition temperatures. Polyarylene sulfoxides are moreover of particular technical interest to the extent that they can be used as high-temperature blowing agents for producing plastic foams.

Despite these many advantageous material properties, polyarylene sulfoxides have not so far been very widely used since these polymers are industrially complicated to prepare and the material is therefore relatively expensive.

In the prior art pure polyarylene sulfoxide, having a proportion of ≧99% of sulfoxide groups in the polymer chain, is synthesized by introducing polyarylene sulfide powder into 86% strength nitric acid. During this reaction the polyarylene sulfide dissolves with vigorous evolution of nitrous gases, ensuring complete oxidation, and then has to be isolated by precipitation in water. This synthetic route was described by Dr. M. Peter in his dissertation "Synthese und Strukturmodifizierung von Poly(thio-1,4-phenylen)" [Synthesis and structural modification of poly(thio-1,4 phenylene)], prepared between 1992 and 1994 in Prof. Heitz's group at the University of Marburg.

The known process, which initially served merely to characterize the polyarylene sulfide used, was subsequently optimized for the preparation of sample quantities of polyarylene sulfoxide to the extent that it was discovered that from about 130 to 150 units by weight of PPS powder (PPS=polyphenylene sulfide) can be dissolved in 600 units by volume of 86% strength $HNO_3$. The viscous solution can then be introduced dropwise with vigorous stirring (using an Ultraturrax) into a large excess of water, the precipitated PPSO (PPSO=polyphenylene sulfoxide) reaction product filtered off with suction, washed until neutral and dried.

However, this process known as the $HNO_3$ process is not very suitable for conversion to industrial scale for production purposes, since the complicated isolation of the product from the reaction mixture makes the process expensive and therefore not cost-effective. The industrial handling of nitric acid at this high concentration is also very complicated. Other versions of processes for preparing PPSO by oxidizing PPS were therefore proposed.

One other way is to oxidize PPS using $N_2O_4$ in an autoclave, directly in a gas/solid phase reaction, or with methylene chloride as suspension medium, or in dichloroacetic acid as solvent. However, the latter procedure is hardly different from the known $HNO_3$ process, since here, too, the PPSO dissolves and is troublesome to isolate (EP-A-0 791 027).

Another way is given by a process in which the oxidation is carried out using $H_2O_2$ in sulfuric acid (→Caro's acid) or dichloroacetic acid (→dichloroperacetic acid) under specific conditions. This is described in DE-A 197 51 239.9.

Of the processes mentioned above the process in sulfuric acid using $H_2O_2$ as oxidant has shown itself to be of particular industrial interest due to the quality of the resultant product in terms of degree of oxidation and weight loss on decomposition, and to its feasibility of industrial application, specifically with regard to the handling of the substances used and released.

However, a disadvantage is that with the $H_2SO_4/H_2O_2$ process, unlike in the $HNO_3$ process, very careful attention has to be paid to the stoichiometry of the reaction components and moreover to the feeding of the oxidant in very small steps, otherwise there is a risk of excessive oxidation and the formation of undesirable sulfone groups.

It was therefore an object of the present invention to provide a process which prepares polyarylene sulfoxide by oxidizing polyarylene sulfide, gives a good yield of pure polyarylene sulfoxide and which is easily handled industrially to the extent that the resultant product, polyarylene sulfoxide, can be isolated from the reaction mixture by simple means.

This object has been achieved by a process of the type mentioned at the outset, the characterizing feature of which is that polyarylene sulfide is treated with nitric acid at a concentration of from 60 to 80%, with heating.

The polyarylene sulfide preferably used according to the invention is polyphenylene sulfide (PPS). However, according to the invention it is also possible to react polymers with other arylene units having up to 20 carbon atoms, such as naphthylene or anthraquinone units, or having substituted phenylene units whose substituents have from 1 to 10 carbon atoms, or having heteroaromatic arylene units.

The concentration of the nitric acid according to the invention preferably used for oxidizing the polyarylene sulfides is from 60 to 80%, preferably from 65 to 75%, particularly preferably from 68 to 69.99%.

The temperature at which the novel oxidation of the polyarylene sulfides is carried out with nitric acid is from 60 to 120° C., preferably from 75 to 100° C., particularly preferably from 80 to 90° C.

The period for which the novel oxidation of polyarylene sulfide to polyarylene sulfoxide is carried out is from 30 to 120 min, preferably from 60 to 80 min.

The amount of nitric acid needed for complete oxidation of the polyarylene sulfide is adjusted to give a molar ratio of $HNO_3$ to polyarylene sulfide of from 5:1 to 20:1, preferably from 9.0:1 to 11:1, particularly preferably from 9.5:1 to 10.5:1.

According to the invention, air or oxygen may also be passed through the reactor so that NO produced during the oxidation reaction is further oxidized directly to $NO_2$, which advantageously and at low industrial cost can be condensed and reclaimed.

According to the invention the polyarylene sulfoxide produced is isolated from the reaction mixture by cooling the reaction mixture to a temperature of from 60 to 70° C. after the reaction time has expired, whereupon polyarylene sulfoxide produced by the oxidation begins to precipitate from a temperature as high as 75° C., and then diluting the cooled reaction mixture with water while stirring continues. Once the mixture has reached a temperature of from 20 to 50° C. after further cooling the product may be filtered off, washed with water until neutral and, for example, dried in a drying cabinet or dryer.

Since the first filtrate has a very high concentration of acid it may, if desired, be worked up again to give nitric acid of the desired concentration for the oxidation reaction and thus reintroduced into the reaction loop.

The working examples below are intended to give further illustration of the invention and its industrial advantages for the skilled worker.

Examples 1 to 12

In a series of experiments as in Examples 1 to 12 the objective was to optimize the oxidation of PPS to PPSO with commercially available nitric acid, which had a concentration of 69.6±0.1%, For this, the reaction vessel was modified stepwise (round flask with stirrer with a precision glass gland; double-wall reactor with steel stirrer; introduction of high-performance condensers for reclaiming nitrous gases evolved) or the process was modified to the extent that PPS powder was an initial charge and nitric acid was added or vice versa:nitric acid was an initial charge and PPS was added. In addition, air or oxygen was introduced in order to oxidize nitrous gases produced so that these could more easily be condensed and reclaimed.

Example 1

355 g of nitric acid (69.6%), corresponding to 3.92 mol, formed the initial charge in a 1 liter round flask with stirrer, at a temperature of 70° C. A total amount of 45.0 g of PPS, corresponding to 0.42 mol, was added in the form of a fine powder over a period of 15 min, with vigorous stirring. The molar ratio $HNO_3$: PPS was 9.33:1. Stirring was then continued for a period of a further 15 min at a temperature of 90° C.

The reaction mixture was then allowed to cool, and product which had crystallized out was filtered off, washed with water until neutral and dried in a drying cabinet at 120° C. The results are given in Table 1 below.

Example 2

The procedure was as in Example 1, but the PPS was added in the form of a coarse powder. The molar ratio $HNO_3$: PPS was again 9.33:1.

Example 3

43.2 g of PPS, corresponding to 0.4 mol. formed the initial charge in a 1 liter round flask with stirrer and were mixed at room temperature with 370 g of nitric acid (69.6%) corresponding to 4.10 mol. The molar ratio $HNO_3$: PPS was 10.25:1. The reaction mixture was heated to a temperature of 90° C. with continuous stirring and allowed to react at this temperature for a period of 60 min. Work-up was as in Example 1 and the results are listed in Table 1 below.

Example 4

The procedure was as in Example 3, except that the reaction vessel was connected to a reflux condenser. The molar ratio $HNO_3$: PPS was again 10.25:1. The reaction temperature was 91° C. and the reaction time 65 min. The results are found in Table 1.

Example 5

The procedure was as in Example 3, except that the reaction vessel was connected to a high-performance condenser. The molar ratio $HNO_3$: PPS was again 10.25:1. The reaction temperature was set to 87° C. and the reaction time was 45 min.

Example 6

108.1 g of PPS corresponding to 1.0 mol, were mixed with 900 g of nitric acid (69.6%), corresponding to 9.95 mol, at room temperature in a 2 liter round flask with stirrer and high-performance condenser. The molar ratio $HNO_3$: PPS was 9.95:1. The reaction mixture was then heated to a temperature of 90° C. and allowed to react at constant temperature for a period of 45 min with continuous stirring while small volumes of synthetic air were introduced into the mixture. Work-up of the reaction mixture was as in Example 1.

Example 7

The procedure was as in Example 6, except that the reaction vessel had been connected to two high-performance condensers. The molar ratio $HNO_3$: PPS was 9.95:1. The reaction temperature was set to 88° C. and the reaction time was limited to 40 min.

Example 8

108.1 g of PPS, corresponding to 1.0 mol, were mixed with 90° C. of nitric acid (69.6%), corresponding to 9.95 mol. at room temperature in a 2.5 liter two-wall reactor with steel stirrer and two high-performance condensers. The molar ratio $HNO_3$: PPS was 9.95 1. The reaction mixture was then heated to a temperature of 80° C. and the reaction time set at 55 min, while small volumes of synthetic air were introduced in the mixture. Work-up of the reaction mixture was as in Example 1.

Example 9

The procedure was as in Example 8, except that 120 g of PPS, corresponding to 1.11 mol, and 1000 g of nitric acid (69.6%), corresponding to 11.0 mol; formed the initial charge. The molar ratio $HNO_3$: PPS was 9.9:1. The reaction temperature was 80° C. and the reaction time 60 min.

Example 10

The procedure was as in Example 8, but 130 g of PPS, corresponding to 1.20 mol, were mixed with 1080 g of nitric acid (69.6%), corresponding to 11.9 mol. The molar ratio $HNO_3$: PPS was 9.9:1. The reaction temperature was set to 83° C., the reaction time was 65 min and oxygen was used as the gas introduced.

Example 11

The procedure was as in Example 10, except that the reaction temperature was now set to 85° C. and the reaction time to 75 min.

Example 12

The procedure was as in Example 10, except that in this experiment the reaction temperature was lowered to 80° C. and the reaction time was 60 min.

To characterize the products the degree of oxidation was determined by $^1H$ NMR spectroscopy in deuterodichloroacetic acid. The start of the decomposition (temperature in ° C.) and the weight loss occurring during this were also determined, using thermogravimetric analysis (TGA).

The results are given in Table 1 below:

TABLE 1

| Ex. | S content | SO content | $SO_2$ content | Degree of oxidation | Start of decomp. | Weight loss |
|---|---|---|---|---|---|---|
| 1 | ≈0.25% | ≈99.3% | ≤0.45% | 100.2% | 328° C. | 15.6% |
| 2 | ≈0.25% | ≈99.4% | ≤0.35% | 100.1% | 330° C. | 17.3% |
| 3 | ≈0.25% | ≈99.5% | ≤0.25% | 100% | 325° C. | 15.5% |
| 4 | ≈0.25% | ≈99.4% | ≤0.35% | 100.1% | 327° C. | 15.5% |
| 5 | ≈0.30% | ≈99.3% | ≤0.35% | 100% | 328° C. | 15.7% |
| 6 | ≈0.25% | ≈99.4% | ≤0.30% | 100% | 330° C. | 16.3% |
| 7 | ≈0.35% | ≈99.4% | ≤0.25% | 99.9% | 328° C. | 17.6% |
| 8 | ≈0.45% | ≈98.5% | ≤1.0% | 100.5% | 328° C. | 16.4% |
| 9 | ≈0.5% | ≈98.5% | ≤1.0% | 100.5% | 329° C. | 18.0% |
| 10 | ≈0.5% | ≈98.5% | ≤1.0% | 100.5% | 330° C. | 17.5% |
| 11 | ≈0.5% | ≈98.5% | ≤1.0% | 100.5% | 329° C. | 18.0% |

TABLE 1-continued

| Ex. | S content | SO content | $SO_2$ content | Degree of oxidation | Start of decomp. | Weight loss |
|---|---|---|---|---|---|---|
| 12 | ≈0.5% | ≈98.5% | ≤1.0% | 100.5% | 326° C. | 16.0% |

From Examples 1 to 12 it is clear that, the degree of oxidation in the cases of all of the products is within a very narrow range of 100.2±0.3%, and the proportion of SO groups is always above 98.5%. The weight loss measured by TGA for the exothermic decomposition which sets in at a temperature within the range from 325 to 330° C. lies within the band between 15.5 and 18%. The decomposition transition is very steep and is completed over a temperature difference of less than 10 K.

Examples 13 to 17

In another series of experiments, Examples 13 to 17, the fill level of the reactor was varied. The molar ratio $HNO_3$: PPS was, however, held constant at 9.6:1. As in Examples 3 to 12, PPS first formed the initial charge in the reaction vessel, and nitric acid (concentration: 69.6%) was then added at room temperature with slow stirring (about 50 rpm) within a period of from 10 to 15 min. During the addition the temperature of the reaction mixture rose to 37–42° C.

The reaction mixture was then brought to the reaction temperature with vigorous stirring (200 rpm). This caused the PPS clumps initially formed to break up again. After reaction times of from 65 to 80 min at temperatures from 85 to 90° C. the reaction mixtures became clear, implying that all of the PPS had dissolved completely as PPSO.

The reaction solutions were then cooled again with stirring at 50 rpm, whereupon the start of crystallization could be observed from temperatures of about 74–69° C. The rotation rate of the stirrer was increased again to 200–250 rpm for further cooling and at a temperature of about 65° C. the reaction mixture was observed to change to a slurry which was only just stirrable. To precipitate the product completely, from 500 to 600 ml of $H_2O$ were then added, with rapid stirring, and the resultant suspension was discharged via the valve in the base of the reactor, washed with plenty of water until neutral and dried in a drying cabinet at 120° C.

Table 2 below gives the quantities, temperatures and times used for the reactions in Examples 13 to 17.

TABLE 2

| Ex. | $HNO_3$ quantity | PPS quantity | Molar ratio $HNO_3$:PPS | $T_{End}$ | $t_{React.}$ | Comments |
|---|---|---|---|---|---|---|
| 13 | 1080 g (12.0 mol) | 135 g (1.25 mol) | 9.6:1 | 87° C. | 80 min | Crystallization at 74–72° C. |
| 14 | 1120 g (12.4 mol) | 140 g (1.3 mol) | 9.6:1 | 85° C. | 65 min | Crystallization at 69–67° C. |
| 15 | 1200 g (13.3 mol) | 150 g (1.4 mol) | 9.6:1 | 89° C. | 70 min | Crystallization at 71–70° C. |
| 16 | 1280 g (14.2 mol) | 160 g (1.48 mol) | 9.6:1 | 87° C. | 70 min | Crystallization at 75–74° C. |
| 17 | 1360 g (15.1 mol) | 170 g (1.57 mol) | 9.6:1 | 85° C. | 80 min | Crystallization at 72–71° C. |

As in the preceding examples, to characterize the products more precisely the degree of oxidation was determined using $^1$H NMR spectroscopy in deuterodichloroacetic acid and the decomposition temperature, and also the resultant weight loss, were determined using TGA. The results are given in Table 3.

TABLE 3

| Ex. | S content | SO content | $SO_2$ content | Degree of oxidation | Start of decomposition | Weight loss |
|---|---|---|---|---|---|---|
| 13 | ≈0.6% | ≈98.2% | ≈1.2% | 100.6% | 330° C. | 16.4% |
| 14 | ≈0.5% | ≈98.3% | ≈1.2% | 100.7% | 331° C. | 16.0% |
| 15 | ≈0.55% | ≈98.2% | ≈1.25% | 100.7% | 330° C. | 16.0% |
| 16 | ≈0.45% | ≈98.3% | ≈1.25% | 100.8% | 329° C. | 15.5% |
| 17 | ≈0.6% | ≈98.3% | ≈1.1% | 100.5% | 330° C. | 15.9% |

For the products of Examples 13 to 17 the degree of oxidation determined using $^1$H NMR spectroscopy is in the region of 100.5%. The proportion of SO groups is also always greater than 98%. The weight lost measured by thermogravimetric analysis (TGA) is 16.0±0.5% and is thus within a very narrow range.

Examples 18 and 19

In a further series of experiments the concentration of the nitric acid used for the oxidation reaction was varied. The oxidation was carried out in a round flask with stirrer at a temperature of 90° C. for a period of 60 min, and under the other experimental conditions given in Table 4 below.

TABLE 4

Experimental parameters for Examples 18 and 19

| Example | $HNO_3$ conc. | $HNO_3$ quantity (about 200 ml) | PPS quantity | Molar ratio $HNO_3$:PPS |
|---|---|---|---|---|
| 18 | 75% | 287 g (3.42 mol) | 50 g (0.46 mol) | 7.45:1 |
| 19 | 80% | 291 g (3.70 mol) | 70 g (0.65 mol) | 5.7:1 |

After the oxidation reaction the reaction solutions of Examples 18 and 19 were added dropwise while hot (heated dropping funnel) to about 2 liters of $H_2O$ in order to precipitate the product. The product was then filtered off with suction, washed until neutral and characterized after drying. The analytical data are given in Table 5 below.

TABLE 5

Analysis results for Examples 18 and 19

| Ex. | S content | SO content | $SO_2$ content | Degree of oxidation | Start of decomposition | Weight loss |
|---|---|---|---|---|---|---|
| 18 | ≈0.3% | ≈99.5% | <0.25% | 100% | 333° C. | 19.2% |
| 19 | ≈0.25% | ≈99.25% | ≈0.5% | 100.2% | 333° C. | 20.7% |

Example 20

Comparative Example 5.4 g of PPS powder (corresponding to 0.05 mol) formed the initial charge in a 500 ml glass beaker and were mixed with 115 ml of nitric acid with a concentration of 55%. The mixture was heated to boiling point and boiled for 15 min, whereupon the PPS powder used formed clumps to give a highly viscous mass which did not dissolve.

What is claimed is:

1. A process for using nitric acid to oxidize polyarylene sulfide to polyarylene sulfoxide, which comprises treating polyarylene sulfide with nitric acid at a concentration of from 60 to 80% while heating, whereupon at least 98% of the sulfide groups are oxidized to sulfoxide groups.

2. The process as claimed in claim 1, wherein the polyarylene sulfide used is polyphenylene sulfide.

3. The process as claimed in claim 1, wherein the concentration of the nitric acid used to oxidize the polyarylene sulfide is from 65 to 75%.

4. The process as claimed in claim 1, wherein the concentration of the nitric acid used to oxidize the polyarylene sulfide is from 68 to 69.99%.

5. The process as claimed in claim 1, wherein the oxidation of the polyarylene sulfide by nitric acid is carried out at a temperature of from 60 to 120° C.

6. The process as claimed in claim 1, wherein the oxidation of the polyarylene sulfide by nitric acid is carried out at a temperature of from 75 to 100° C.

7. The process as claimed in claim 1, wherein the oxidation of the polyarylene sulfide by nitric acid is carried out at a temperature of from 80 to 90° C.

8. The process as claimed in claim 1, wherein the oxidation of polyarylene sulfide to polyarylene sulfoxide is carried out over a period of from 30 to 120 min.

9. The process as claimed in claim 1, wherein the oxidation of polyarylene sulfide to polyarylene sulfoxide is carried out over a period of from 60 to 80 min.

10. The process as claimed in claim 1, wherein the stoichiometric amount of nitric acid used to oxidize the polyarylene sulfide is such as to comply with a molar ratio of $HNO_3$ to polyarylene sulfide of from 5:1 to 20:1.

11. The process as claimed in claim 1, wherein the stoichiometric amount of nitric acid used to oxidize the polyarylene sulfide is such as to comply with a molar ratio of $HNO_3$ to polyarylene sulfide of from 9.0:1 to 11:1.

12. The process as claimed in claim 1, wherein the stoichiometric amount of nitric acid used to oxidize the polyarylene sulfide is such as to comply with a molar ratio of $HNO_3$ to polyarylene sulfide of from 9.5:1 to 10.5:1.

13. The process as claimed in claim 1, wherein air or oxygen is passed through the reaction mixture during the oxidation reaction.

14. The process as claimed in claim 1, wherein the resultant polyarylene sulfoxide is isolated from the reaction mixture by cooling the reaction mixture to a temperature of from 60 to 70° C. after the reaction time, whereupon the polyarylene sulfoxide resulting from the oxidation begins to precipitate from a temperature of 75° C., and the cooled reaction mixture is then diluted with water.

15. The process as claimed in claim 1, wherein, after cooling, the product is filtered off from the reaction mixture with suction, washed with water until neutral and dried.

\* \* \* \* \*